United States Patent
Elomari et al.

(10) Patent No.: US 7,754,636 B2
(45) Date of Patent: Jul. 13, 2010

(54) REMOVAL OF EXCESS METAL HALIDES FROM REGENERATED IONIC LIQUID CATALYSTS

(75) Inventors: Saleh Elomari, Fairfield, CA (US); Hye-Kyung C. Timken, Albany, CA (US); Howard S. Lacheen, Richmond, CA (US); Thomas V. Harris, Benicia, CA (US); Robert W. Campbell, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 340 days.

(21) Appl. No.: 11/960,319

(22) Filed: Dec. 19, 2007

(65) Prior Publication Data

US 2009/0163349 A1 Jun. 25, 2009

(51) Int. Cl.
| | |
|---|---|
| *B01J 21/20* | (2006.01) |
| *B01J 23/90* | (2006.01) |
| *B01J 25/04* | (2006.01) |
| *B01J 27/28* | (2006.01) |
| *B01J 29/90* | (2006.01) |
| *B01J 31/40* | (2006.01) |
| *B01J 38/00* | (2006.01) |
| *B01J 38/66* | (2006.01) |
| *B01J 38/50* | (2006.01) |
| *B01J 21/00* | (2006.01) |
| *B01J 23/00* | (2006.01) |
| *B01J 25/00* | (2006.01) |
| *B01J 29/00* | (2006.01) |
| *B01J 31/00* | (2006.01) |

(52) U.S. Cl. .............................. 502/26; 502/20; 502/29; 502/100; 502/150

(58) Field of Classification Search .................. 502/26, 502/20, 29, 100, 150
See application file for complete search history.

(56) References Cited

U.S. PATENT DOCUMENTS

| | | | |
|---|---|---|---|
| 4,122,245 | A | 10/1978 | Nardi et al. |
| 4,463,071 | A | 7/1984 | Gifford et al. |
| 4,463,072 | A | 7/1984 | Gifford et al. |
| 5,104,840 | A | 4/1992 | Chauvin et al. |
| 5,731,101 | A | 3/1998 | Sherif et al. |
| 5,750,455 | A | 5/1998 | Chauvin et al. |
| 6,028,024 | A | 2/2000 | Hirschauer et al. |
| 6,096,680 | A | 8/2000 | Park |
| 6,235,959 | B1 | 5/2001 | Hirschauer et al. |
| 6,797,853 | B2 | 9/2004 | Houzvicka et al. |
| 2004/0077914 | A1 | 4/2004 | Zavilla et al. |
| 2004/0133056 | A1 | 7/2004 | Liu et al. |
| 2007/0142676 | A1 | 6/2007 | Elomari et al. |
| 2007/0249485 | A1 | 10/2007 | Elomari et al. |
| 2007/0249486 | A1 | 10/2007 | Elomari et al. |

OTHER PUBLICATIONS

Yves Chauvin, Andre Hirchauer, Helene Olivier; Alkylation of isobutane with 2-butene using 1-butyl-3-methylimidazolium chloride-aluminium chloride molten salts as catalysts; Journal of Molecular Catalysis 92 (1994) 155-165; Elsevier Science B.V., Netherlands.
Peter Wasserscheid, Thomas Welton; Ionic Liquids in Synthesis; 2003; p. 275; Wiley-VCH Verlag GmbH & Co. KGaA.

*Primary Examiner*—Jerry Lorengo
*Assistant Examiner*—James E McDonough
(74) *Attorney, Agent, or Firm*—Susan M. Abernathy; Steven H. Roth

(57) ABSTRACT

A process for removing metal halides from regenerated ionic liquid catalyst comprising interacting a regenerated ammonium-based metal-halide ionic liquid catalyst or an ammonium-based metal-halide ionic liquid catalyst undergoing regeneration with either the parent ammonium halide salt from which the ionic liquid catalyst was made or a corresponding mixed salt having an ammonium halide to metal halide molar ratio of 0 to less than 2.0 is disclosed.

16 Claims, No Drawings

REMOVAL OF EXCESS METAL HALIDES FROM REGENERATED IONIC LIQUID CATALYSTS

FIELD OF THE INVENTION

The present invention relates to methods for the regeneration of catalysts and more specifically to the regeneration of ionic liquid catalysts.

BACKGROUND OF THE INVENTION

In general, conversion of light paraffins and light olefins to more valuable cuts is very lucrative to the refining industries. This has been accomplished by alkylation of paraffins with olefins, and by polymerization of olefins. One of the most widely used processes in this field is the alkylation of isobutane with $C_3$ to $C_5$ olefins to make gasoline cuts with high octane number using sulfuric and hydrofluoric acids. This process has been used by refining industries since the 1940's. The process was driven by the increasing demand for high quality and clean burning high-octane gasoline.

Alkylate gasoline is a high quality and efficient burning gasoline that constitutes about 14% of the gasoline pool. Alkylate gasoline is typically produced by alkylating refineries isobutane with low-end olefins (mainly butenes). Currently, alkylates are produced by using HF and $H_2SO_4$ as catalysts. Although these catalysts have been successfully used to economically produce the best quality alkylates, the need for safer and environmentally friendlier catalysts systems has become an issue to the industries involved.

The quest for an alternative catalytic system to replace the current environmentally unfriendly catalysts has been the subject of varying research groups in both academic and industrial institutions. Unfortunately, thus far, no viable replacement to the current processes has been put into practice at commercial refineries.

Ionic liquids are liquids that are composed entirely of ions. The so-called "low temperature" Ionic liquids are generally organic salts with melting points under 100 degrees C., often even lower than room temperature. Ionic liquids may be suitable for example for use as a catalyst and as a solvent in alkylation and polymerization reactions as well as in dimerization, oligomerization acylation, metatheses, and copolymerization reactions.

One class of ionic liquids is fused salt compositions, which are molten at low temperature and are useful as catalysts, solvents and electrolytes. Such compositions are mixtures of components which are liquid at temperatures below the individual melting points of the components.

Ionic liquids can be defined as liquids whose make-up is entirely comprised of ions as a combination of cations and anions. The most common ionic liquids are those prepared from organic-based cations and inorganic or organic anions. The most common organic cations are ammonium cations, but phosphonium and sulphonium cations are also frequently used. Ionic liquids of pyridinium and imidazolium are perhaps the most commonly used cations. Anions include, but not limited to, $BF_4^-$, $PF_6^-$, haloaluminates such as $Al_2Cl_7^-$ and $Al_2Br_7^-$, $[(CF_3SO_2)_2N]^-$, alkyl sulphates ($RSO_3^-$), carboxylates ($RCO_2^-$) and many other. The most catalytically interesting ionic liquids for acid catalysis are those derived from ammonium halides and Lewis acids (such as $AlCl_3$, $TiCl_4$, $SnCl_4$, $FeCl_3$ ... etc). Chloroaluminate ionic liquids are perhaps the most commonly used ionic liquid catalyst systems for acid-catalyzed reactions.

Examples of such low temperature ionic liquids or molten fused salts are the chloroaluminate salts. Alkyl imidazolium or pyridinium chlorides, for example, can be mixed with aluminum trichloride ($AlCl_3$) to form the fused chloroaluminate salts. The use of the fused salts of 1-alkylpyridinium chloride and aluminum trichloride as electrolytes is discussed in U.S. Pat. No. 4,122,245. Other patents which discuss the use of fused salts from aluminum trichloride and alkylimidazolium halides as electrolytes are U.S. Pat. Nos. 4,463,071 and 4,463,072.

U.S. Pat. No. 5,104,840 describes ionic liquids which comprise at least one alkylaluminum dihalide and at least one quaternary ammonium halide and/or at least one quaternary ammonium phosphonium halide; and their uses as solvents in catalytic reactions.

U.S. Pat. No. 6,096,680 describes liquid clathrate compositions useful as reusable aluminum catalysts in Friedel-Crafts reactions. In one embodiment, the liquid clathrate composition is formed from constituents comprising (i) at least one aluminum trihalide, (ii) at least one salt selected from alkali metal halide, alkaline earth metal halide, alkali metal pseudohalide, quaternary ammonium salt, quaternary phosphonium salt, or ternary sulfonium salt, or a mixture of any two or more of the foregoing, and (iii) at least one aromatic hydrocarbon compound.

Other examples of ionic liquids and their methods of preparation may also be found in U.S. Pat. Nos. 5,731,101; 6,797,853 and in U.S. Patent Application Publications 2004/0077914 and 2004/0133056.

In the last decade or so, the emergence of chloroaluminate ionic liquids sparked some interest in $AlCl_3^-$ catalyzed alkylation in ionic liquids as a possible alternative. For example, the alkylation of isobutane with butenes and ethylene in ionic liquids has been described in U.S. Pat. Nos. 5,750,455; 6,028,024; and 6,235,959 and open literature (Journal of Molecular Catalysis, 92 (1994), 155-165; "Ionic Liquids in Synthesis", P. Wasserscheid and T. Welton (eds.), Wiley-VCH Verlag, 2003, pp 275).

Aluminum chloride-catalyzed alkylation and polymerization reactions in ionic liquids may prove to be commercially viable processes for the refining industry for making a wide range of products. These products range from alkylate gasoline produced from alkylation of isobutane and isopentane with light olefins, to diesel fuel and lubricating oil produced by alkylation and polymerization reactions.

As a result of use, ionic liquid catalysts become deactivated, i.e. lose activity, and may eventually need to be replaced. However, ionic liquid catalysts are expensive and replacement adds significantly to operating expenses by in some cases requiring shut down of an industrial process. One of the heretofore unsolved problems impeding the commercial use of chloroaluminate ionic liquid catalysts has been the inability to regenerate and recycle them. The present invention provides methods to facilitate the regeneration of acidic chloroaluminate ionic liquid catalysts.

For example, during the regeneration of spent chloroaluminate ionic liquid catalyst and removing conjunct polymers using aluminum metal, aluminum trichloride is produced. While some of the produced aluminum trichloride can be recycled back into the catalyst to compensate for the aluminum trichloride lost during the alkylation reaction, most of the produced aluminum trichloride precipitates as superfluous solids. This could cause gumming and plugging problems in a catalyst regeneration unit and other parts of a catalyst recycling system.

SUMMARY OF THE INVENTION

The present disclosure relates to a process for removing metal halides from regenerated ionic liquid catalyst comprising interacting a regenerated ammonium-based metal-halide ionic liquid catalyst or an ammonium-based metal-halide ionic liquid catalyst undergoing regeneration with either the parent ammonium halide salt from which the ionic liquid catalyst was made or a corresponding mixed salt having an ammonium halide to metal halide molar ratio of 0 to less than 2.0.

DETAILED DESCRIPTION

As a result of use, ionic liquid catalysts become deactivated, i.e. lose activity, and may eventually need to be replaced. The deactivated catalyst can be revived in a nondestructive manner by freeing up the $AlCl_3$ from a conjunct polymer-$AlCl_3$ complexes and by converting the neutral $AlCl_4^-$ species to the active $AlCl_3$ and $Al_2Cl_7^-$ species. $AlCl_3$ no longer bound by conjunct polymers or free chlorides is then released to take part in catalytic reactions. See, for example, U.S. Published Patent Applications Nos. 2007-0249485 A1, and 2007-0249486 A1, which are incorporated by reference herein.

In one method of regeneration, a used ionic liquid catalyst contacts a regeneration metal in the presence of added hydrogen. Hydrogen pressures used may vary from quite low to very high values, typically from about 100 to 2,500 psig. In another method of regeneration, a used ionic liquid catalyst contacts a regeneration metal in the absence of added hydrogen.

The metal used for regeneration is selected from Groups III-A, II-B or I-B. Specific examples of the metal catalysts are B, Al, Ga, In, Tl, Zn, Cd, Cu, Ag and Au. These metals may be used in any form, alone, in combination or as alloys. For example, the regeneration metal may be used with other substances such as an inorganic oxide catalyst supports.

The metals may be in the form of fine particles, granules, sponges, gauzes, etc. Each metal may be used in any number of forms: (1) macroscopic, which includes wires, foils, fine particles, sponges, gauzes, granules, etc.; and (2) microscopic, which includes powders, smokes, colloidal suspensions, and condensed metal films.

An appropriately effective amount of metal is employed for regeneration. The amount of metal, say aluminum, added in the regeneration scheme is determined by the degree of deactivation, and the amount (concentration) of the conjunct polymers in the spent ionic liquid catalyst, which is a very good indicator of catalyst activity. For example, the amount of metal used for the regeneration of a given spent catalyst is usually added in excess to the concentration of conjunct polymers present in the spent catalyst.

In one embodiment, the metal selection for the regeneration is based on the composition of the ionic liquid catalyst. The metal should be selected carefully to prevent the contamination of the catalyst with unwanted metal complexes or intermediates that may form and remain in the ionic liquid catalyst phase. For example in this embodiment, aluminum metal will be the metal of choice for the regeneration when the catalyst system is chloroaluminate ionic liquid-based catalyst. The use of any other metal may change the overall composition of the catalyst.

As noted previously, ionic liquid catalysts may become deactivated during use. For example, in an alkylate production unit, light ($C_2$-$C_5$) olefins and isoparaffin feeds are contacted in the presence of a catalyst that promotes the alkylation reaction. In one embodiment, this catalyst is a chloroaluminate ionic liquid. The reactor, which may be a stirred tank or other type of contactor (e.g., riser reactor), produces a biphasic mixture of alkylate hydrocarbons, unreacted isoparaffins, and ionic liquid catalyst containing some conjunct polymers. The dense catalyst/conjunct polymer phase may be separated from the hydrocarbons by gravity settling in a decanter. This catalyst will be partially deactivated by the conjunct polymers binding to $AlCl_3$. The recovered catalyst can be reactivated in a regeneration scheme in the presence of a metal. The products of this step will be reactivated catalyst and removable conjunct polymers among others as described herein. The reactivated catalyst and the conjunct polymers can be separated now, for example, by solvent extraction, decantation, and filtration.

In one embodiment, a used ionic liquid catalyst/conjunct polymer mixture is introduced continuously into a regeneration reactor, which contains a regeneration metal. Inert hydrocarbons in which conjunct polymers are soluble are fed into the reactor at the desired rate. The inert hydrocarbons may be a normal hydrocarbons ranging from $C_3$-$C_{15}$ and their mixtures, preferably $C_5$-$C_8$ although other hydrocarbons may be employed. The residence time, temperature and pressure of the reactor will be selected to allow the desired reactivation of the ionic liquid catalyst. The reaction product is withdrawn and sent to a separator. This mixture is then separated into two streams, one comprising inert hydrocarbons and removable conjunct polymers and a second comprising regenerated ionic liquid catalyst. A gravity decanter is used to separate the mixture, from which the ionic liquid phase, which is denser than other components, is withdrawn. The reactivated ionic liquid catalyst is returned to the alkylation reactor. The solvent/conjunct polymer mix is separated by distillation to recover the solvent.

During the regeneration of, for example, a spent chloroaluminate ionic liquid catalyst using aluminum metal to remove conjunct polymers and rejuvenate the activity of the catalyst to its original strength, aluminum trichloride is produced as part of the regeneration chemistry. Aluminum trichloride is a solid compound which can accumulate in the regeneration zone and other parts of the regeneration unit resulting in plugging problems. The ideal composition of a chloroaluminate ionic liquid system such as n-butyl pyridinium chloroaluminate and suitable for alkylation is usually 2 molar equivalents aluminum trichloride to 1 molar equivalent n-butyl pyridinium chloride. Any excess aluminum trichloride beyond its solubility limit may precipitate out during the ionic liquid regeneration process. The addition of n-butyl pyridinium chloride or its chloroaluminate derivatives of Al/N molar composition of less than 2 to the reaction zone during regeneration results in in-situ combination with aluminum trichloride to form additional ionic liquid catalyst and effects the removal of the excess aluminum trichloride. Similarly, the addition of n-butyl pyridinium chloride to regenerated ionic liquid outside of the reaction zone after regeneration results in in-situ combination with aluminum trichloride to form additional ionic liquid catalyst and effects the removal of the excess aluminum trichloride. Removal of metal halides, such as aluminum trichloride, as used herein means that the metal halide solubilizes to make ionic liquid catalyst. The metal halide is not removed physically from the mixture.

In an embodiment, a process for removing aluminum trichloride during an ionic liquid catalyst regeneration comprises contacting a spent ionic liquid catalyst with a ammonium halide and a regeneration metal in a reaction zone under regeneration conditions. The produced aluminum trichloride interacts in situ with the ammonium halide to make additional ionic liquid catalyst and effects the removal of aluminum trichloride. Additional catalyst generated can be left in the unit or it can be withdrawn for later use.

In another embodiment, a process for removing aluminum trichloride after an ionic liquid catalyst regeneration comprises adding an ammonium halide to the regenerated catalyst which contains excess aluminum trichloride which interact to make additional ionic liquid catalyst and effect the removal of aluminum trichloride.

In another embodiment, a process for removing aluminum trichloride during an ionic liquid catalyst regeneration comprises contacting a spent ionic liquid catalyst with N-butylpyridinium chloroaluminate salt having a Nitrogen/Aluminum molar ratio less than 2.0 ($C_4H_9C_5H_5NAl_xCl_{3x+1}$, where X is in the range of 0 to <2.0 and a regeneration metal in a reaction zone under regeneration conditions. The produced aluminum trichloride interacts in situ with ammonium halide to make an ionic liquid catalyst and effects the removal of aluminum trichloride.

In another embodiment, a process for removing aluminum trichloride after an ionic liquid catalyst regeneration comprises adding N-butylpyridinium chloroaluminate salt with Nitrogen/Aluminum molar ratio less than 2.0 ($C_4H_9C_5H_5NAl_xCl_{3x+1}$, where X is in the range of 0 to <2.0) to the regenerated catalyst which contains excess aluminum trichloride which interact to make additional ionic liquid catalyst and effect the removal of aluminum trichloride.

Regeneration of spent chloroaluminate ionic liquids with aluminum metal is not believed to be a catalytic process. Rather, it is believed that aluminum is consumed and aluminum trichloride is produced during the regeneration. The additional $AlCl_3$ is removed at some point from the catalyst system. In one embodiment, the aluminum chloride produced during regeneration can be removed from the catalyst phase by adding the parent ammonium chloride salt from which the catalyst was made. In the case of butyl-pyridinium chloroaluminate ionic liquid system, for example, a small amount of butyl pyridinium chloride salt can be added to the regeneration reactor where the salt reacts with excess aluminum chloride to make more ionic liquid. In other words, the produced aluminum trichloride can be consumed in a reaction with butyl-pyridinium chloride to make ionic liquid in situ during the regeneration.

The amount of aluminum chloride produced during regeneration is dependent on how much aluminum metal is consumed in a given regeneration cycle. By measuring the aluminum consumption rate with a level gauge, one can estimate the aluminum chloride formation rate. Then the amount of ammonium halide or ammonium metal halide needed is the corresponding equivalent moles of salt to make aluminum chloride into the ionic liquid.

The specific examples used herein refer to alkylation processes using ionic liquid systems, which are amine-based cationic species mixed with aluminum chloride. The catalyst exemplified for the alkylation process is a 1-alkyl-pyridinium chloroaluminate, such as 1-butyl-pyridinium heptachloroaluminate.

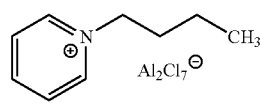

1-Butyl-pyridinium heptachloroaluminate

As noted above, the acidic ionic liquid may be any acidic ionic liquid. In one embodiment, the acidic ionic liquid is a chloroaluminate ionic liquid prepared by mixing aluminum trichloride ($AlCl_3$) and a hydrocarbyl substituted pyridinium halide, a hydrocarbyl substituted imidazolium halide, trialkylammonium hydrohalide or tetraalkylammonium halide of the general formulas A, B, C and D, respectively,

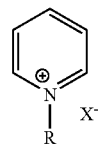

A

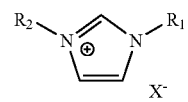

B

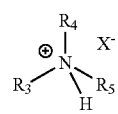

C

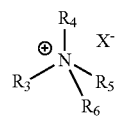

D where R=H, methyl, ethyl, propyl, butyl, pentyl or hexyl group and X is a haloaluminate and preferably a chloride, and $R_1$ and $R_2$=H, methyl, ethyl, propyl, butyl, pentyl or hexyl group and where $R_1$ and $R_2$ may or may not be the same, and $R_3$, $R_4$, and $R_5$ and $R_6$=methyl, ethyl, propyl, butyl, pentyl or hexyl group and where $R_3$, $R_4$, $R_5$ and $R_6$ may or may not be the same.

The acidic ionic liquid is preferably selected from the group consisting of 1-butyl-4-methyl-pyridinium chloroaluminate, 1-butyl-pyridinium chloroaluminate, 1-butyl-3-methyl-imidazolium chloroaluminate and 1-H-pyridinium chloroaluminate.

It is not necessary that the metal halide removal process is limited to regenerated ionic liquid catalysts or ionic liquid catalysts undergoing regeneration. If, for example, fresh 1-butyl-pyridinium chloroaluminate was contaminated with aluminum trichloride, an ammonium halide could be used to effect removal of the contamination in the manner as described herein for regenerated catalyst. It is also not necessary that the ammonium halide or mixed salt used to effect removal have the same metal as the metal halide to be removed. The ammonium halide could contain metal selected from Groups III-A, II-B or I-B. Specific examples are B, Al, Ga, In, Tl, Zn, Cd, Cu, Ag and Au. In an embodiment the invention is a process for removing metal halides from ionic liquid catalyst comprising interacting an ammonium-based metal-halide ionic liquid catalyst with either a metal ammonium halide salt or a mixed salt having an ammonium halide to metal halide molar ratio of 0 to less than 2.0.

EXAMPLES

The following Examples are illustrative of the present invention, but are not intended to limit the invention in any way beyond what is contained in the claims which follow.

Example 1

A 300 cc autoclave equipped with an overhead stirrer was charged with 100 gm of spent ionic liquid containing 24 wt % conjunct polymers, 8 gm of aluminum powder and 60 gm of n-hexane. The autoclave was sealed and heated to 100 deg C. and was allowed to stir at maximum speed (~1600 rpm) for 90 minutes. Then, the reaction was cooled down to room temperature. The reaction mixture was let to settle and the hydrocarbon layer (top layer) was decanted off. The ionic liquid layer with the aluminum powder was rinsed twice with anhydrous n-hexane and all the hexane rinses decanted layer were combined and then concentrated to remove the solvent hexane and recover the polymers. The ionic liquid layer (phase) containing the aluminum powder was filtered in glove box (inert atmosphere) to separate the regenerated ionic liquid catalyst from aluminum. The obtained ionic liquid catalyst, 65 gm, appeared as a transparent amber solution. This ionic liquid catalyst was let to stand at room temperature for few hours where it turned from transparent to opaque. After standing at room temperature overnight, the ionic liquid became transparent with aluminum trichloride precipitate at the bottom. To this solution, 1 gm of butyl-pyridinium chloride, which is to react with the precipitated aluminum chloride, was added and stirred for few minutes at room temperature. The precipitate disappeared and standing at room temperature over the weekend did not result in any precipitation nor did it lose its transparency. The added butyl-pyridinium chloride reacted with the excess aluminum trichloride to make additional ionic liquids.

Example 2

A 300 cc autoclave equipped with an overhead stirrer was charged with 100 gm of spent ionic liquid containing 24 wt % conjunct polymers, 8 gm of aluminum powder, 1.5 gm of butyl-pyridinium chloride, and 60 gm of n-hexane. As in Example 1, the autoclave was sealed and heated to 100 deg C. and was allowed to stir at maximum speed (~1600 rpm) for 90 minutes. Then, the reaction was cooled down to room temperature. Again, as in Example 1, the reaction mixture was let to settle and the hydrocarbon layer (top layer) was separated from the ionic liquid and aluminum by decanting off the top layer. The ionic liquid layer with the aluminum powder was rinsed twice with anhydrous n-hexane and all the hexane rinses decanted layer were combined and then concentrated to remove the solvent hexane and recover the polymers. The ionic liquid layer (phase) containing the aluminum powder was filtered in glove box (inert atmosphere) to separate the regenerated ionic liquid catalyst from aluminum. The obtained ionic liquid catalyst, 68 gm, appeared as a transparent amber solution. Unlike the regenerated catalyst obtained in Example 1, the catalyst did not became opaque on standing at room temperature for several days and no aluminum trichloride precipitate was observed after standing at room temperature for two weeks. The inclusion of butyl-pyridinium chloride from the start during the regeneration appeared to interact in situ with the produced aluminum trichloride to make ionic liquid catalyst.

Example 3

Example 2 was repeated except 1.5 gm of butyl-pyridinium chloride was placed with 3.0 gm of N-butylpyridinium tetrachloro aluminate, $N-C_4H_9C_5H_5NAlCl_4$ and regeneration was conducted per same operating procedure. The resulting ionic liquid catalyst after regeneration and conjunct polymer separation did not generate $AlCl_3$ precipitate. Decanted layers were combined and then concentrated to remove the solvent hexane and recover the polymers. The ionic liquid layer (phase) containing the aluminum powder was filtered in glove box (inert atmosphere) to separate the regenerated ionic liquid catalyst from aluminum. The obtained ionic liquid catalyst, 68 gm, appeared as a transparent amber solution like the regenerated catalyst obtained in Example 2. The inclusion of N-butylpyridinium tetrachloro aluminate, $N-C_4H_9C_5H_5NAlCl_4$ during the regeneration consumed the produced aluminum trichloride to make additional ionic liquid catalyst.

There are numerous variations on the present invention which are possible in light of the teachings and supporting examples described herein. It is therefore understood that within the scope of the following claims, the invention may be practiced otherwise than as specifically described or exemplified herein.

What is claimed is:

1. A process for removing a metal halide from regenerated ionic liquid catalyst, comprising: interacting a regenerated ammonium-based metal-halide ionic liquid catalyst or an ammonium-based metal-halide ionic liquid catalyst undergoing regeneration with either
   (a) a parent ammonium halide salt from which the regenerated ammonium-based metal-halide ionic liquid catalyst or the ammonium-based metal-halide ionic liquid catalyst undergoing regeneration was made, or
   (b) a corresponding mixed salt;
wherein the parent ammonium halide salt or the corresponding mixed salt have an ammonium halide to the metal halide molar ratio of 0 to less than 2.0.

2. A process according to claim 1, wherein the metal is a Group III-A, II-B or I-B metal.

3. The process according to claim 1, wherein the regenerated ammonium-based metal-halide ionic liquid catalyst or the ammonium-based metal-halide ionic liquid catalyst undergoing regeneration is a chloroaluminate ionic liquid prepared by mixing aluminum halide and a hydrocarbyl substituted pyridinium halide or a hydrocarbyl substituted imidazolium halide.

4. A process for removing Group III-B metal halides during ionic liquid catalyst regeneration, comprising: contacting a spent ammonium-based Group III-B metal-halide ionic liquid catalyst salt with either the parent ammonium halide salt from which the spent ammonium-based Group III-B metal-halide ionic liquid catalyst salt was made or a corresponding mixed salt having an ammonium halide to metal halide molar ratio of 0 to less than 2.0 and a regeneration metal in a reaction zone under regeneration conditions whereby Group III-B metal halides produced during regeneration interacts in situ with the salt to make a regenerated ionic liquid catalyst and effects the removal of the Group III-B metal halides.

5. A process according to claim 4, wherein the metal is aluminum.

6. The process according to claim 4, wherein the spent ammonium-based Group III-B metal-halide ionic liquid catalyst salt is a chloroaluminate ionic liquid prepared by mixing aluminum halide and a hydrocarbyl substituted pyridinium halide or a hydrocarbyl substituted imidazolium halide.

7. A process for removing Group III-B metal halides from a regenerated ammonium-based Group III-B metal halide ionic liquid catalyst, comprising: contacting the regenerated ammonium-based Group III-B metal halide ionic liquid catalyst with either the parent ammonium halide salt from which the regenerated ammonium-based Group III-B metal halide ionic liquid catalyst was made or a corresponding mixed salt having an ammonium halide to metal halide molar ratio of 0 to less than 2.0; whereby Group III-B metal halides produced during regeneration interact with the parent ammonium halide salt or the corresponding mixed salt to make a regenerated ionic liquid catalyst and effect the removal of the Group III-B metal halides.

8. A process according to claim 7, wherein the metal is aluminum.

9. The process according to claim 7, wherein the regenerated ammonium-based Group III-B metal halide ionic liquid catalyst is a chloroaluminate ionic liquid prepared by mixing aluminum halide and a hydrocarbyl substituted pyridinium halide or a hydrocarbyl substituted imidazolium halide.

10. A process for removing aluminum trichloride during ionic liquid catalyst regeneration comprising contacting a spent N-butylpyridinium chloroaluminate ionic liquid catalyst with an N-butylpyridinium chloroaluminate salt having a Nitrogen/Aluminum molar ratio less than 2.0 ($C_4H_9C_5H_5NAl_xCl_{3x+1}$, where X is in the range of 0 to <2.0) and a regeneration metal in a reaction zone under regeneration conditions whereby aluminum trichloride produced during regeneration interacts in situ with the salt to make N-butylpyridinium chloroaluminate ionic liquid catalyst ionic liquid catalyst and effects the removal of aluminum trichloride.

11. A process for removing aluminum trichloride from regenerated N-butylpyridinium chloroaluminate ionic liquid catalyst comprising contacting the regenerated catalyst with an N-butylpyridinium chloroaluminate salt having a Nitrogen/Aluminum molar ratio less than 2.0 ($C_4H_9C_5H_5NAl_xCl_{3x+1}$, where X is in the range of 0 to <2.0) whereby aluminum trichloride produced during regeneration interacts with the salt to make N-butylpyridinium chloroaluminate ionic liquid catalyst and effects the removal of aluminum trichloride.

12. A process for removing metal halides from ionic liquid catalyst, comprising: interacting an ammonium-based metal-halide ionic liquid catalyst with either a metal ammonium halide salt or a mixed salt having an ammonium halide to a metal halide molar ratio of 0 to less than 2.0.

13. The process according to claim 1, wherein the metal halide is aluminum trichloride.

14. The process according to claim 4, wherein the Group III-B metal halides comprise aluminum trichloride.

15. The process according to claim 7, wherein the Group III-B metal halides comprise aluminum trichloride.

16. The process according to claim 12, wherein the metal halide is aluminum trichloride.

* * * * *